W. ROWELL.
TRANSMITTING MOTION.
No. 64,450. Patented May 7, 1867.
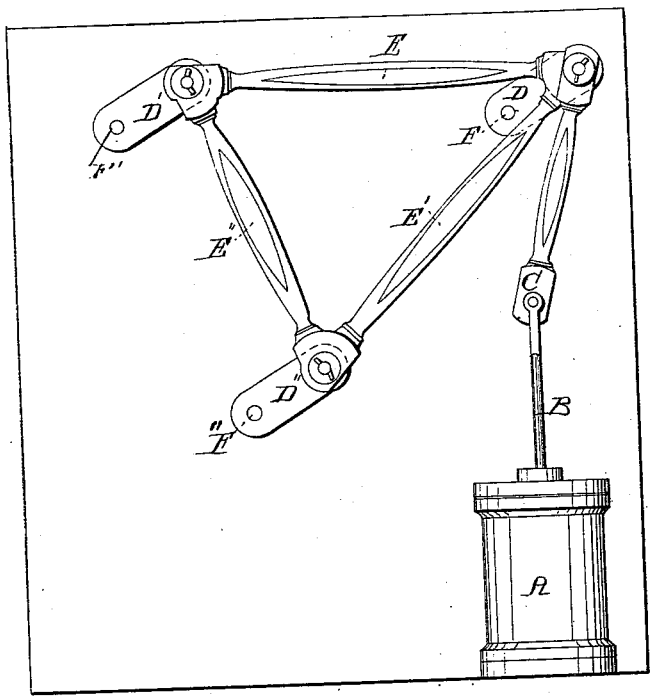
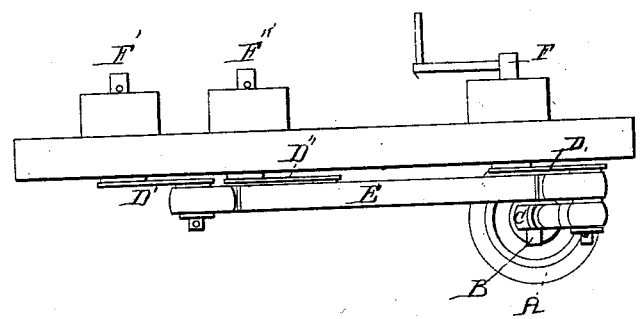
Witnesses:
Chas. Morrill
Edw. Rowell
Inventor:
Warren Rowell

United States Patent Office.

WARREN ROWELL, OF NEW YORK, N. Y.

Letters Patent No. 64,450, dated May 7, 1867.

---

IMPROVEMENT IN TRANSMITTING MOTION.

---

The Schedule referred to in these Letters Patent and making part of the same.

---

TO ALL WHOM IT MAY CONCERN:

Be it known that I, WARREN ROWELL, of the city, county, and State of New York, have invented a new and useful Improvement in Transmitting Motion; and I do hereby declare that the following is a full, clear, and exact description of the same, reference being had to the accompanying drawing, forming part of this specification, in which—

Figure 1 is a front elevation of my invention.
Figure 2 is a plane or top view.
Similar letters indicate corresponding parts in both figures.

My invention consists in the combination of three cranks, connected together by rods, or their equivalents, and so arranged that by imparting rotary motion by an ordinary piston-rod or otherwise to the one crank a rotary motion will be given to the other cranks, and hence to the shafts to which they are attached without the employment of gear-wheels or belting.

A designates a steam cylinder, and B the piston-rod, to which is connected a pitman-rod, C. The pitman-rod C is connected to a crank, D, in the usual manner. There are also connected to the crank D two arms E E'. The arms E E' are connected respectively to two cranks D' D''. The two cranks D' D'' are connected together by an arm, E''. Each crank may be connected to a shaft, as F F' F''. The cranks are so arranged relatively to each other that no two will be on a centre at the same time, therefore by revolving the crank D a rotary motion must be imparted to each of the other cranks, and when the device is once started the operation will be easy and perfect. The crank D is thrown upward, which, through the arm E, throws outward the arm E', which, as it progresses, draws upward the crank D'' through the medium of the arm E'', the arm E' the meanwhile controlling the crank D''; therefore all the cranks will revolve and consequently give a rotary motion to the shafts to which they are connected. I do not limit myself to the employment of arms for connecting the cranks, but the connection must be such and the cranks so arranged that the desired motion will be transmitted from one to the other. I have shown in fig. 2 a winch, a, for throwing the crank D over its centre in starting, but a fly-wheel may be employed on the shaft F, and all the other shafts, if desirable, which would acquire sufficient momentum to carry the crank past its centre in starting. By this arrangement I dispense with the employment of gear-wheels and belting, and instead thereof employ the arms and cranks through which a rotary motion is given to one or two shafts in addition to the one directly acted upon by the piston-rod of the steam engine. By this arrangement I am enabled also to dispense with the working-beam or side levers in marine and other engines, and still have my cylinders in any position relatively to the main crank-shaft, or paddle or propeller shaft.

What I claim as my invention, and desire to secure by Letters Patent, is—

The combination of the cranks D D' D'', and arms or rods E E' E'', or other suitable connection, so arranged relatively with each other that when rotary motion is imparted to the crank D, it will be transmissible to the cranks D' D'', and the shafts connected thereto, as herein described.

WARREN ROWELL.

Witnesses:
CHAS. MORRILL,
EDW. ROWELL.